US008432974B2

(12) United States Patent
Chen

(10) Patent No.: US 8,432,974 B2
(45) Date of Patent: Apr. 30, 2013

(54) METHOD AND SYSTEM FOR COMPRESSION OF HYPERSPECTRAL OR MULTISPECTRAL IMAGERY WITH A GLOBAL OPTIMAL COMPRESSION ALGORITHM (GOCA)

(75) Inventor: Wei Chen, Potomac, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 401 days.

(21) Appl. No.: 12/834,334

(22) Filed: Jul. 12, 2010

(65) Prior Publication Data

US 2011/0007819 A1    Jan. 13, 2011

Related U.S. Application Data

(60) Provisional application No. 61/224,517, filed on Jul. 10, 2009.

(51) Int. Cl.
  *H04N 7/12* (2006.01)
  *H04N 11/02* (2006.01)
  *H04N 11/04* (2006.01)
(52) U.S. Cl.
  USPC .............................. 375/240.19; 375/240.01
(58) Field of Classification Search .................. None
  See application file for complete search history.

(56) References Cited

U.S. PATENT DOCUMENTS

| | | | | |
|---|---|---|---|---|
| 6,535,647 B1 * | 3/2003 | Abousleman | ................. | 382/253 |
| 6,539,122 B1 * | 3/2003 | Abousleman | ................. | 382/240 |
| 6,804,400 B1 * | 10/2004 | Sharp | ............................. | 382/239 |
| 2003/0021472 A1 * | 1/2003 | Nichogi et al. | ............... | 382/166 |
| 2006/0269140 A1 * | 11/2006 | Ramsay et al. | ............... | 382/191 |
| 2009/0161753 A1 * | 6/2009 | Youn et al. | ............... | 375/240.01 |

OTHER PUBLICATIONS

Jing Zhang and Guizhong Liu, An Efficient Reordering Prediction-Based Lossless Compression Algorithm for Hyperspectral Images, Apr. 2007, IEEE Geoscience and Remote Sensing Letters, vol. 4 No. 2, pp. 283-287.*

Jing Zhang and Guizhong Liu, A Novel Lossless Compression for Hyperspectral Images by Adaptive Classified Arithmetic Coding in Wavelet Domain, 2006, IEEE, International Conference on Image Processing (ICIP) 2006, pp. 2269-2272.*

Chen, W.; Mied, R.P.; and Shen, C.Y., "Estimation of Surface Velocity from Infrared Image Using the Global Optimal Solution to an Inverse Model", Geoscience and Remote Sensing Symposium, 2008; IGARSS 2008; IEEE International; vol. 1, pp. I-384-I-386, IEEE, 2008.

Chen, W., Mied, R. P., and Shen, C. Y., "Near-Surface Ocean Velocity from Infrared Images: Global Optimal Solution to an Inverse Model", Journal of Geophysical Research-Oceans, vol. 113, C10003, pp. 1-13, (2008).

* cited by examiner

*Primary Examiner* — Joseph Ustaris
*Assistant Examiner* — Ellyar Y Barazesh
(74) *Attorney, Agent, or Firm* — Amy Ressing; Sally A. Ferrett

(57) ABSTRACT

A computer based method and system for compressing digital hyperspectral or multispectral image data. The method includes initially reducing the plurality of spectral bands of the hyperspectral data to a smaller number of spectral bands using principal component analysis, determining an optimum compression ratio for each of the smaller number of spectral bands for use in a wavelet transform, and subsequently compressing the smaller number of spectral bands spatially using the wavelet transform with the optimum compression ratios.

8 Claims, 6 Drawing Sheets

METHOD AND SYSTEM FOR COMPRESSION OF HYPERSPECTRAL OR MULTISPECTRAL IMAGERY WITH A GLOBAL OPTIMAL COMPRESSION ALGORITHM (GOCA)

CROSS-REFERENCE TO RELATED APPLICATIONS

This Application is a non-provisional application under 35 USC 119(e) of, and claims the benefit of, U.S. Provisional Application 61/224,517 filed on Jul. 10, 2009, the entire disclosure of which is incorporated by reference herein.

BACKGROUND

1. Technical Field

The invention relates generally to the field of data compression, and more specifically, to compression of hyperspectral or multispectral image data.

2. Related Technology

Recent advances in satellite and aerial imagery systems have made it possible to collect voluminous amounts of satellite and aerial imagery data. The sensors used in generating the images are typically characterized as either "multispectral" or "hyperspectral". Multispectral sensors collect images of a terrain or landscape and provide a handful of wide spectral bands of imagery. These bands encompass the visible, short wave infrared, and, in some cases, thermal infrared portion of the electromagnetic spectrum.

In recent years, there has been increased interest in the field of hyperspectral remote sensing. Hyperspectral imagers are a new generation of remote-sensing instruments that record the sensed optical energy in a number of narrow contiguous wavelength channels. They can collect image data in hundreds of spectral channels simultaneously and over wavelengths ranging from ultraviolet to thermal infrared. The spectral measurements contain information from reflected, or emitted, energy from a surface and the effects of the intervening atmosphere. Hyperspectral data from remote sensors is used in a variety of applications including geology, oceanography, agriculture, ecology, medical imagery, and atmospheric science.

The large number of bands in hyperspectral systems leads to a sharp increase in data volume compared to multispectral systems such as LandSat. As a consequence, compression of hyperspectral data to facilitate real time transmission and/or subsequent storage has become an important research endeavor. Because one of the primary purposes of using hyperspectral sensors is to identify features, such as buildings, crops, or identify minerals, by their spectral signature, maintaining the spectral integrity of each pixel is very important. The spatial quality of the individual band images must also be preserved. The task of compressing hyperspectral data is essentially an optimization problem, balancing image quality and spectral integrity against data compression ratios and processing requirements.

Lossy compression algorithms for hyperspectral and multispectral images can be roughly categorized by how they exploit redundancies in the spatial and spectral dimensions. The first group of algorithms is comprised of single stage methods that do not differentiate between the spatial and spectral directions. Examples in this group include various Vector Quantization (VQ) schemes to compress hyperspectral data. Other non-VQ systems have also been recently introduced. Examples include the use of bijection mappings onto zero-trees. The 3D wavelet transform is another single stage method. For example, JPEG2000 privates several options to compress 3D data cube.

The second group of approaches for lossy multichannel image compression relies on two stages of data processing that exploit the spectral and spatial redundancies separately. Typical approaches are to use the Principal Component Analysis (PCA), Irreversible Component Transformation (ICA), Linear Mixing Model (LMM), or wavelets to spectrally decorrelate the hyperspectral data, followed by an adaptive discrete cosine transform (DCT) or discrete wavelet transform (DWT) coding technique to compress along the spatial directions.

A method for compressing hyperspectral data is disclosed in U.S. Pat. No. 6,167,156 to J. A. Antoniades et al. and is discussed in "Bowles, J., Chen, W., and Gillis, D., "ORASIS framework—benefits to working within the linear mixing model", IEEE 2003, pp. 96-98.

BRIEF SUMMARY

An aspect of the invention is directed to a computer based method for compressing digital hyperspectral data having a plurality of spectral bands, each band having a plurality of image pixels. The method includes receiving the digital hyperspectral imagery, reducing the plurality of spectral bands of the hyperspectral data to a smaller number of spectral bands using principal component analysis, determining an optimum compression ratio for each of the smaller number of spectral bands for use in a wavelet transform, and subsequently compressing the smaller number of spectral bands spatially using the wavelet transform with the optimum compression ratios.

Finding an optimum compression ratio for each of the smaller number of spectral bands can include minimizing the spatial mean square error found as a sum of a semi-empirical rate distortion function for non-Gaussian images.

Finding an optimum compression ratio for each of the smaller number of spectral bands can include minimizing the overall mean square error according to $$MSE_{xy}(cr_1, cr_2, \ldots cr_{N_r}) = \frac{1}{N_z} \sum_{m=1}^{N_r} \left[ e^{a_m\left(1 - 1/cr_m^{b_m}\right)} - 1 \right] \text{ and}$$

$$\sum_{m=1}^{N_r} \frac{1}{cr_m} = \frac{N_r}{cr}.$$

Another aspect of the invention is directed to a computer readable non-transitory medium storing programmed instructions for compressing received digital hyperspectral image data, the digital hyperspectral image data having a plurality of spectral bands and each spectral band having a plurality of image pixels. The instructions include instructions for reducing the plurality of spectral bands of the hyperspectral data to a smaller number of spectral bands using principal component analysis, instructions for determining an optimum compression ratio for each of the smaller number of spectral bands for use in a wavelet transform, and instructions for subsequently compressing the smaller number of spectral bands spatially using the wavelet transform with the optimum compression ratios.

Finding an optimum compression ratio for each of the smaller number of spectral bands can include minimizing the spatial mean square error found as a sum of a semi-empirical rate distortion function for non-Gaussian images.

Finding an optimum compression ratio for each of the smaller number of spectral bands can include minimizing the overall mean square error according to $$MSE_{xy}(cr_1, cr_2, \ldots cr_{Nr}) = \frac{1}{N_z} \sum_{m=1}^{N_r} \left[ e^{a_m \left(1 - 1/cr_m^{b_m}\right)} - 1 \right]$$

and $$\sum_{m=1}^{N_r} \frac{1}{cr_m} = \frac{N_r}{cr}.$$

Another aspect of the invention is directed to a system for compressing received digital hyperspectral image data, the digital hyperspectral image data having a plurality of spectral bands and each spectral band having a plurality of image pixels. The system can include a receiver for receiving the digital hyperspectral image data, and a computer system having programmed instructions for reducing the plurality of spectral bands of the hyperspectral data to a smaller number of spectral bands using principal component analysis. The instructions include instructions for determining an optimum compression ratio for each of the smaller number of spectral bands for use in a wavelet transform, and instructions for subsequently compressing the smaller number of spectral bands spatially using the wavelet transform with the optimum compression ratios.

DETAILED DESCRIPTION OF EMBODIMENTS

Figure 1:
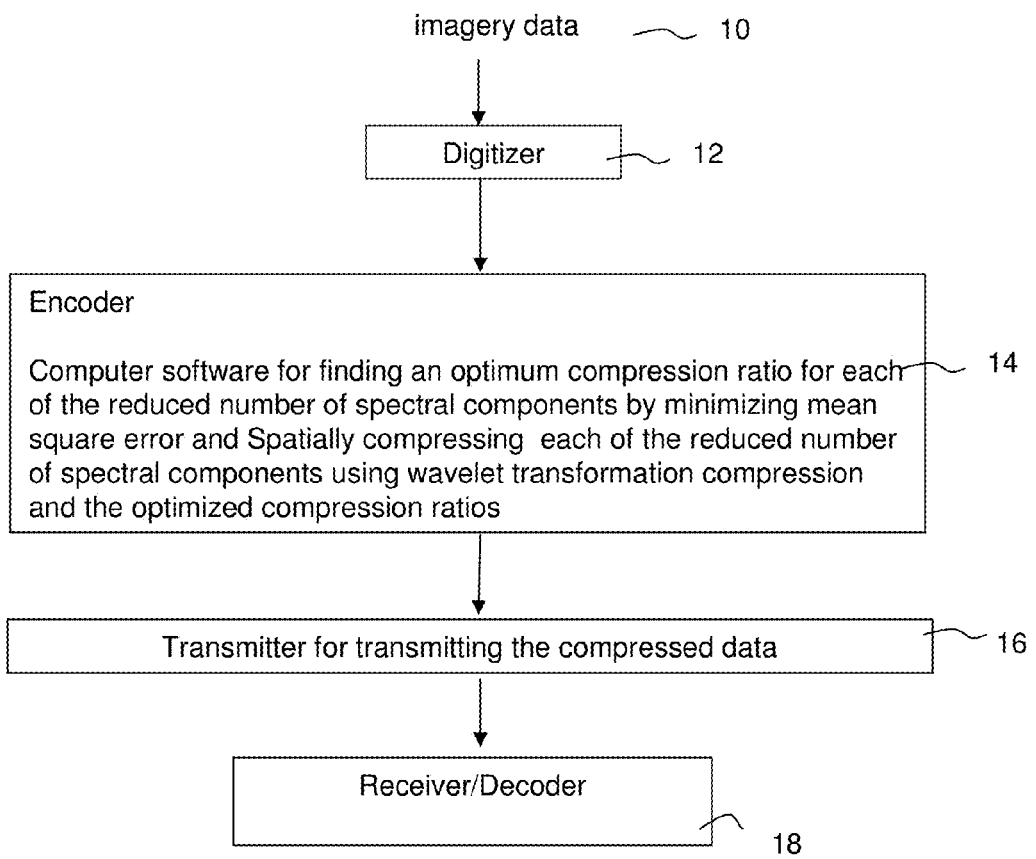
FIG. 1 is a block diagram of an imaging system for implementing a compression method in accordance with an embodiment of the invention.

FIG. 1 is a high level block diagram of an imaging system for acquiring, digitizing, and compressing the hyperspectral or multispectral imagery data. One or more sensors acquire the imagery data 10. The sensors may be realized using any of various types of instrument systems which provide signals indicative of spectral reflectance, such as multi-band digital imaging cameras, color television cameras, multi-band infrared scanners, visible light microscopes, spectroradiometers and the like. If analog, the sensor signals are provided to a digitizer 12, which produces a set of image pixels in each spectral band, and the resulting digitized hyperspectral or multispectral images are provided to an encoder 14. The encoder 14 is a computer system with a processor capable of image procession including data compression. The encoder 14 may also include discrete logic devices, specially designed integrated circuits, and commercially available processors used to implement the systems and methods consistent with this invention.

The image data in a single image pixel provided to the encoder 14 consists of a number of data samples which collectively form a hyperspectral "signature" of the image pixel. As an example, each data sample can correspond to the reflectance of the surface or terrain of interest at some spectral wavelength. As described in later paragraphs the encoder 14 operates to compress the received hyperspectral image data and to provide the resultant compressed image data to a transmitter 16 for transmission across a communications link to a receiver 18.

The sensor or sensors, digitizer, encoder and transmitter can be carried aboard a spacecraft or satellite, and the transmitter can transmit the compressed hyperspectral data to a ground-based receiver. However, the method and system described herein is not limited to such space-based or aerial applications, and is also suitable for compressing ground-based multispectral or hyperspectral images, such as three band red-green-blue imagery or medical images.

Figure 2:
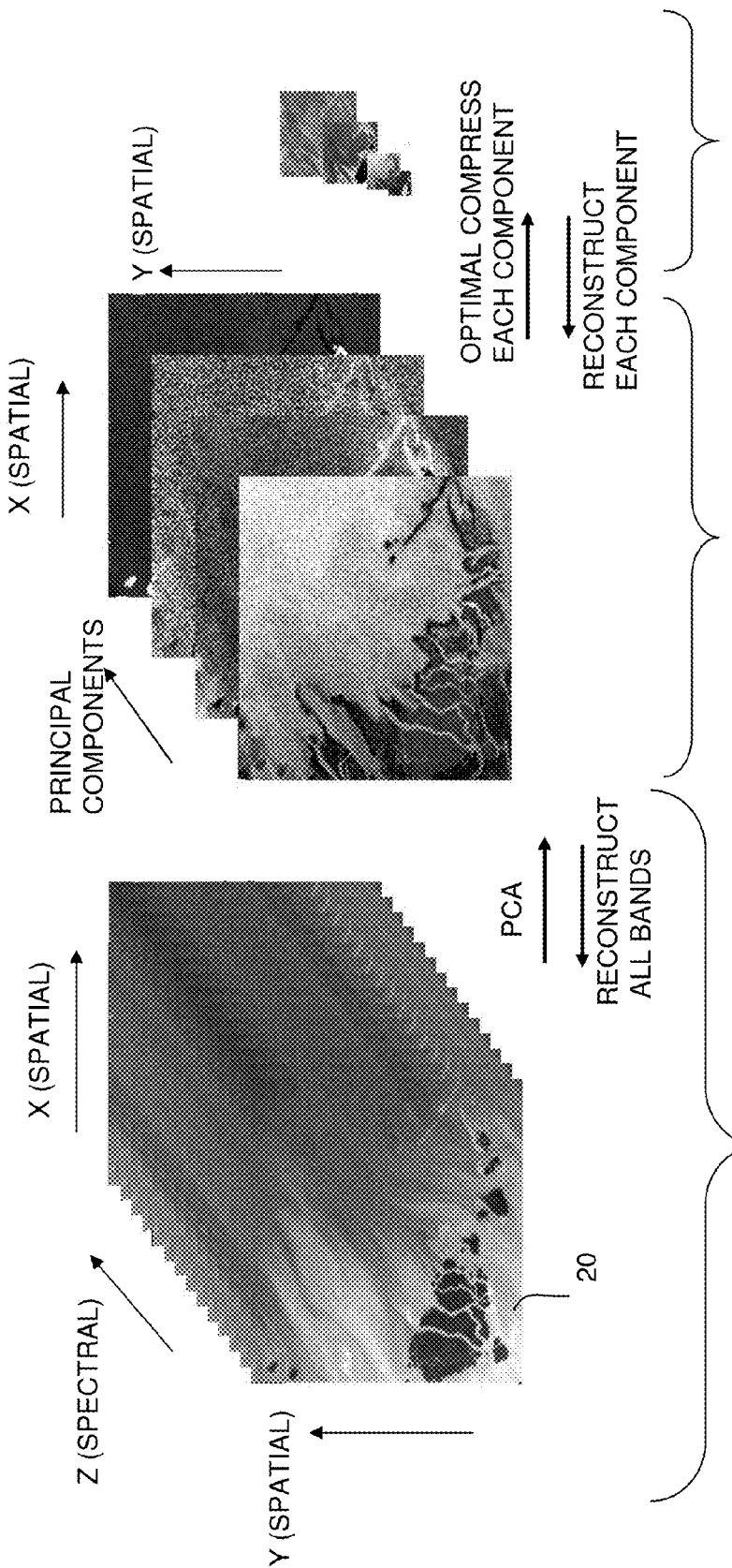
FIGS. 2A, 2B, and 2C illustrate a hyperspectral data cube with one spectral dimension and two spatial dimensions.

FIG. 2A shows an illustrative system for hyperspectral data cube 20 having two spatial dimensions (x,y) and one spectral dimension ($\lambda$) with imagery from many spectral bands. The data can be hundreds or thousands of pixels in each of the x and y directions, and can include several hundred bands in the spectral dimension. FIG. 2B shows the hyperspectral data cube as a reduced number of spectral components after Principle Component Analysis is applied to the data. FIG. 2C shows the relative amount of information in each of the reduced number of spectral components. For example, the first spectral component or band is shown as a larger image, to denote that it contains most of the information. The relative size of the second and third images indicate that these spectral components or bands contain less information than the first image. In order to preserve the largest amount of information in the first spectral component, a small compression ratio can be applied to that component, and increasingly larger compression ratios can be applied to the second, third, and subsequent components. In this way, the spectral bands that carry the most information are compressed less, and the spectral bands that carry lesser amounts of information are compressed more.

Figure 3:
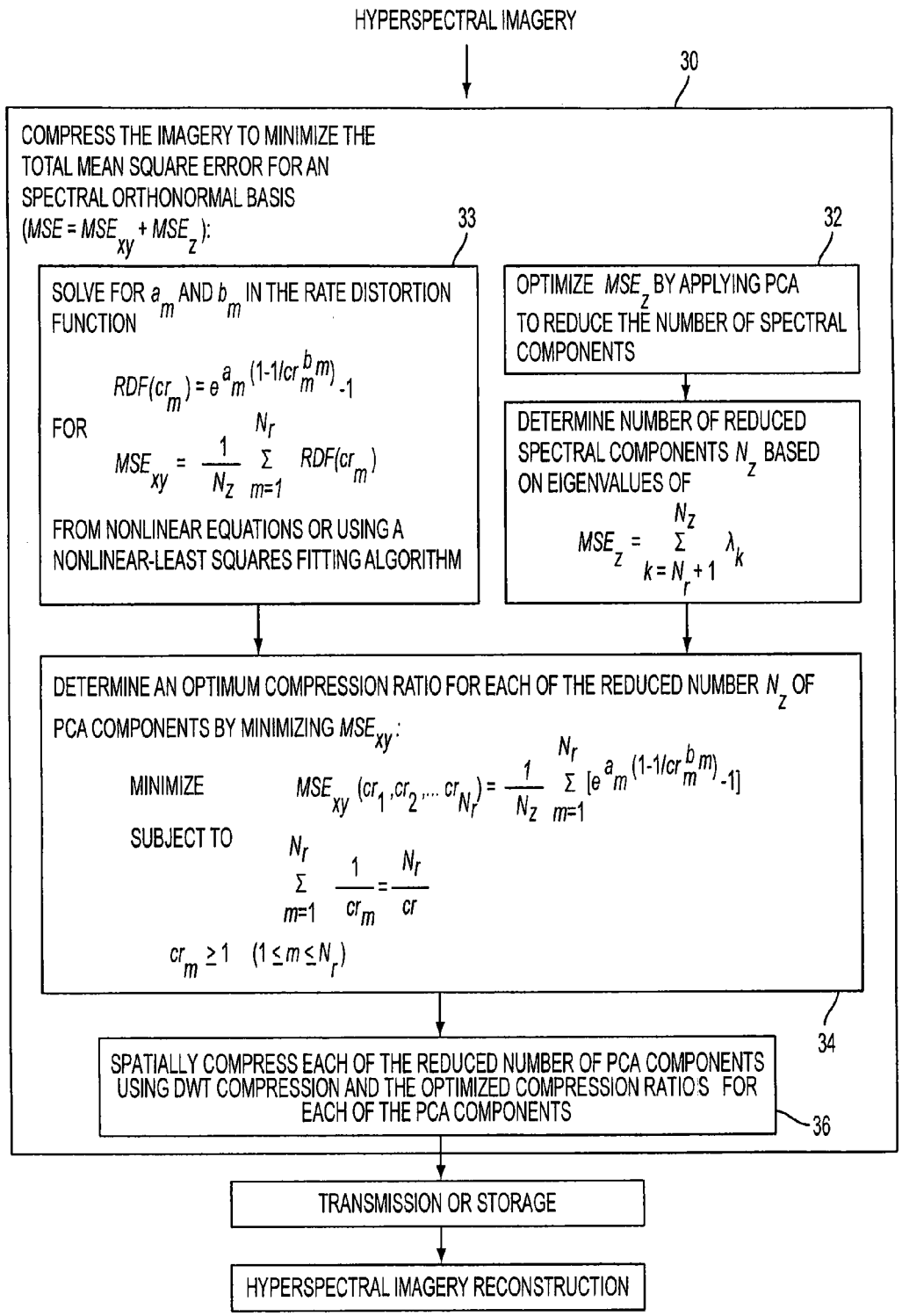
FIG. 3 illustrates a data compression method in accordance with an embodiment of the invention.

FIG. 3 shows a method 30 for use in the encoder for compressing hyperspectral data intended to provide a very high compression ratio and low distortion using optimized, variable spatial compression ratios. The system can be described as including a global optimal compression algorithm (GOCA) for hyperspectral and multispectral imagery, which will be described in further detail as follows.

The method 30 is based on using both a Principal Component Analysis (PCA) and the discrete wavelet transform. The hyperspectral data cube is processed separately in both the spatial and spectral dimensions. The digitized data is first compressed in the spectral dimension using Principal Component Analysis 32 to reduce the number of spectral components or bands needed to represent the data. For example, the Principal Component Analysis might reduce the number of components or bands from several hundred to a much smaller number of components, for example, to ten spectral components.

The reduced spectral component data is then compressed along the spatial dimension using a wavelet transform. In order to optimize the wavelet transform for compression of each of the spectral components, each of the spectral components will have an optimized individual compression ratio for the wavelet transform.

The method can minimize the Mean Square Error for both the spatial and spectral dimensions by using the PCA compression in the spectral dimension and the wavelet transform in the spatial dimension. The total Mean Square Error (MSE) for an orthonormal basis (for example, for a PCA transform) can be written as:

$$MSE = MSE_{xy} + MSE_z,$$

where $MSE_{xy}$ is the error of spatial compression and $MSE_z$ is the truncation error after the orthonormal transform.

The truncation error for a PCA compression is $$MSE_z = \sum_{k=N_r+1}^{N_z} \lambda_k$$

where $N_r$ is a remained hyperspectral dimension after the PCA transform, $\lambda_k$ are the eigenvalues of the PCA covariance matrix, and $N_z$ is the number of hyperspectral components before the PCA transform is applied.

The spatial compression error $MSE_{xy}$ is a function of compression ratio and can be expressed as $$MSE_{xy} = \frac{1}{N_z} \sum_{m=1}^{N_r} RDF(cr_m),$$

where $cr_m$ is the compression ratio for a particular band, $N_r$ is the number of the remaining components in the spectral PCA transform space, and $RDF(cr_m)$ is the Rate Distortion Function (RDF).

Thus, the problem of minimization of the total MSE becomes minimizing in the spatial and spectral dimensions separately. An optimized PCA transform is performed to minimize the truncation error $MSE_z$ resulting from the PCA transform. An optimized set of compression ratios used with the wavelet transform compression can be found by minimizing the spatial errors $MSE_{xy}$ with the compression ratios $cr_m$ for each of the PCA transformed spectral bands as adjustable parameters. Detailed steps are shown in FIG. 3 and include:

At step 32, apply a Principal Component Analysis (PCA) transform across the spectral components to obtain the spectral $MSE_z$ values.

Next, in order to separately compress each de-correlated component using the wavelet transform, first find the optimum compression ratio for each of the spectral components.

A new semi-empirical rate distortion function for non-Gaussian images is:

$$RDF(cr_m) = \frac{1}{N_{xy}} \sum_{i=1}^{N_{xy}} \Delta u_m^2(i, cr_m) = e^{a_m\left(1 - 1/cr_m^{b_m}\right)} - 1,$$

where $N_{xy}$ is the number of total pixels in spatial space ($N_{xy} = N_x \times N_y$); $\Delta u_m(i, cr_m)$ is a reconstructed error of the PCA component; $cr_m$ is a compression ratio of the component; and $a_m$ and $b_m$ are unknown parameters. Both $a_m$ and $b_m$ can be determined by solving a nonlinear equations or using a non-linear-least squares fitting algorithm, because the function values in the RDF equation can be calculated by changing the compression ratios.

Note that because the first few components of the PCA transform carry the most spectral information, using the optimal compression ratio for each component is important to minimizing the spatial $MSE_{xy}$.

Thus, at step 34, find the optimal compression ratios $cr_m$ (or bit rate) by minimizing the spatial $MSE_{xy}$ with compression ratio as parameters for all reduced components according to:

$$\text{Minimize } MSE_{xy}(cr_1, cr_2, \ldots cr_{N_r}) = \frac{1}{N_z} \sum_{m=1}^{N_r} \left[ e^{a_m\left(1 - 1/cr_m^{b_m}\right)} - 1 \right]$$

$$\text{Subject to } \sum_{m=1}^{N_r} \frac{1}{cr_m} = \frac{N_r}{cr}$$

and $$cr_m \geq 1 (1 \leq m \leq N_r)$$

where $cr$ is the total uniform compression ratio in spatial space for a spectral component m. This is a general nonlinear optimization problem with a set of inequality constraints. Introducing a penalty function, the optimization problem with constraints can be converted into an unconstrained optimization problem.

After the compression ratios for the spectral components are found, at step 36, compress each de-correlated component using a wavelet transform and image coding technique that uses the set of optimal compression ratios $cr_m$ obtained as shown above.

Note that the spectral compression ratio is equal to the ratio of the original number of spectral components in the hyperspectral image to the reduced number of spectral components in the image after PCA transformation ($N_z/N_r$).

Therefore, the total compression ratio (CR) in this compression scheme is approximately equal to the product of the total uniform compression ratio and the spectral compression ratio:

$$CR = \frac{N_z}{N_r} \cdot cr$$

This method for hyperspectral/multispectral data compression is optimized in both spectral and spatial spaces, which is a great improvement over current compression algorithms. The spatial optimization problem is solved by use of a semi-empirical rate distortion function with two unknown parameters for non-Gaussian images.

The method can also include transmission of the compressed data to a receiver, and decoding the data with a decoder that is a pair to the encoder 14 of FIG. 1.

Figure 4:
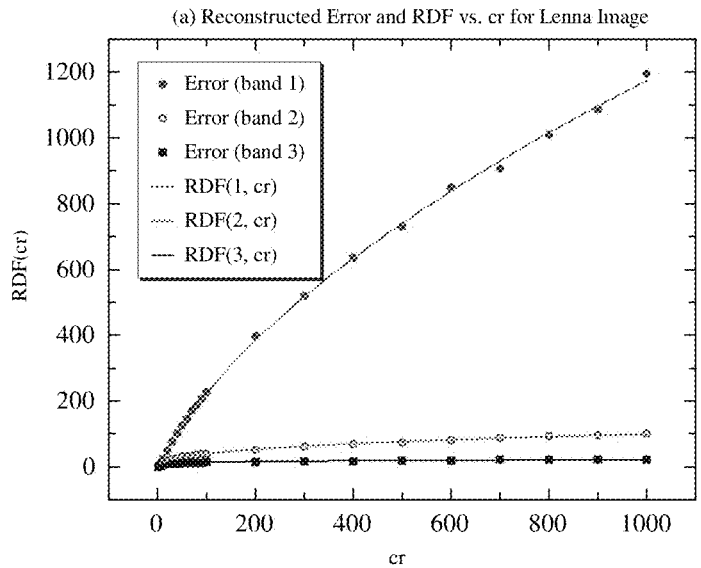
FIG. 4 shows the rate distortion function and reconstructed error versus compression ratio for a three-band Lenna test image.
Figure 5:
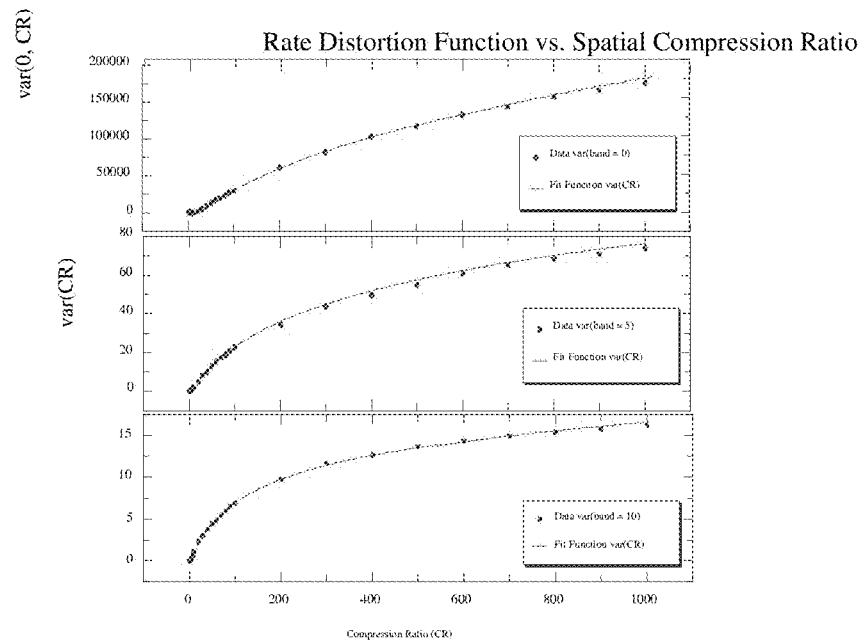
FIG. 5 shows the variance at bands 1, 5, and 10 and the fit function variance versus compression ratio for a 63-band Florida Keys test image.

FIGS. 4 and 5 show two examples of applying the rate distortion function to Lenna and Florida Keys test images, respectively. FIG. 4 plots the reconstructed error for three bands and the rate distortion function (RDF) for the three bands versus compression ratio for the Lenna test image. FIG. 5 plots the variance at bands 1, 5, and 10 and the fit function variance versus compression ratio for a 63 band hyperspectral image. These plots indicate that the rate distortion function produces a good fit over almost all ranges of the compression ratio for non-Gaussian images.

Figure 6:
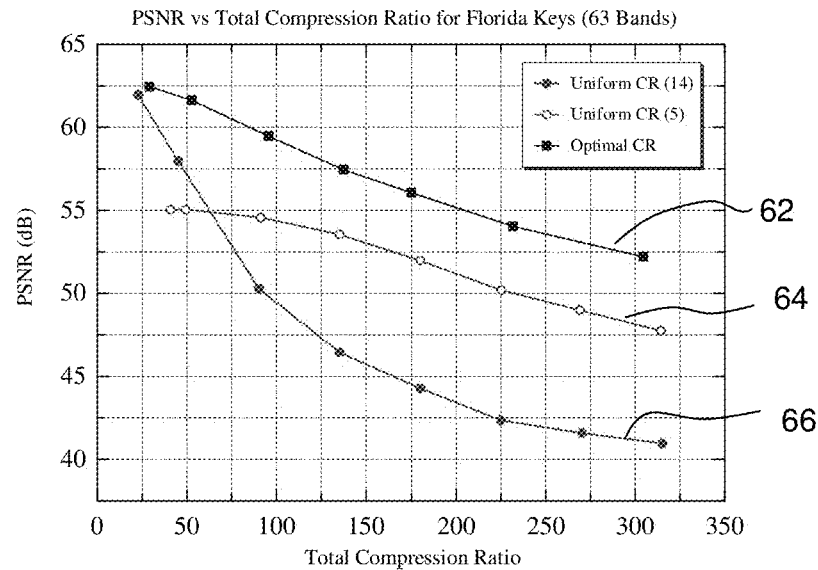
FIG. 6 compares the data compression method of FIG. 3 with two different uniform discrete wavelength transform methods for 63-band Florida Keys test image in terms of peak signal-to-noise ratio (PSNR) versus compression ratio.
Figure 7:
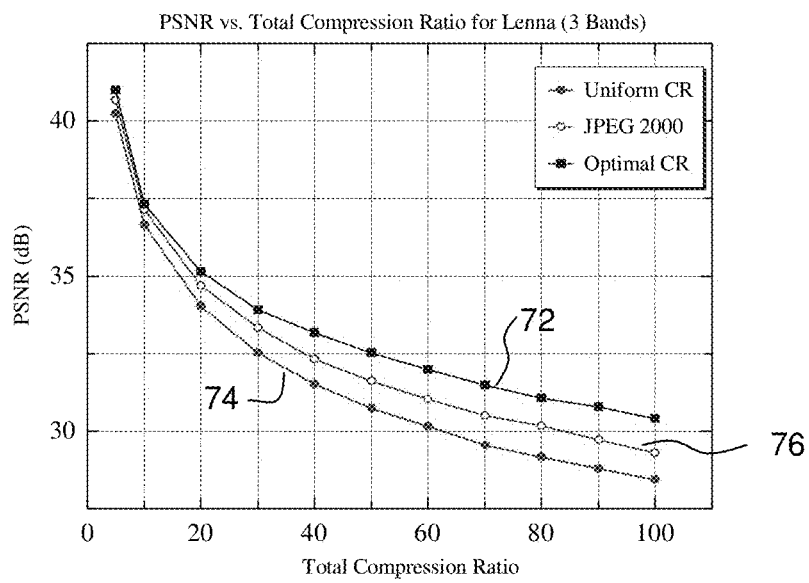
FIG. 7 compares data compression method of FIG. 3 with a JPEG 2000 data compression method and a uniform compression ratio DWT method for a 3-band Lenna test image in terms of peak signal-to-noise ratio (PSNR) versus compression ratio.

FIGS. 6 and 7 show the experimental results of applying the GOCA method described herein to 63 band Florida Keys test imagery. The GOCA and two different uniform DWT compression algorithms were used on the imagery. Each compressed image was then decompressed and quantitative analysis was performed to compare each compressed-then-decompressed image with its corresponding original image. The statistical indices computed were mean square error (MSE), signal-to-noise ratio (SNR), and peak signal-to-noise ratio (PSNR).

The FIG. 6 curve 62 shows the peak signal to noise ratio (PSNR) versus total compression ratio for the GOCA method with $N_r$=14 and optimal compression ratios determined according to the RDF function. Curve 64 shows the PSNR for a method using PCA for spectral compression and a uniform compression ratio discrete wavelength transform spatial compression with $N_r$=5. Curve 66 shows the PSNR for a method using PCA for spectral compression and a uniform compression ratio discrete wavelength transform spatial compression with $N_r$=14. Note that the GOCA method can provide up to 250% improvement in total compression ratio for the same PSNR compared to the PCA-DWT with uniform compression ratio and $N_r$=14 for Florida Keys data.

FIG. 7 includes a plot 72 of the peak signal to noise ratio (PSNR) versus total compression ratio for a three band Lenna color image with data compression using the GOCA method of FIG. 3. A plot 74 shows the PSNR for a compression method using PCA and uniform discrete wavelet transform (DWT), and plot 76 shows the PSNR for a compression method that includes JPEG 2000 with Irreversible Component Transform (ICT) for spectral compression and DWT for spatial compression. The last two channels of ICT are subsampled by a factor of 2 in each image before compression (YUV 1:2:2). The results at the higher ranges of the total compression ratio show that the GOCA method can provide up to a 30% improvement over JPEG 2000 that used Irreversible Component Transform (ICT) for spectral and DWT for spatial compression for Lenna three band color image.

Figure 8A:
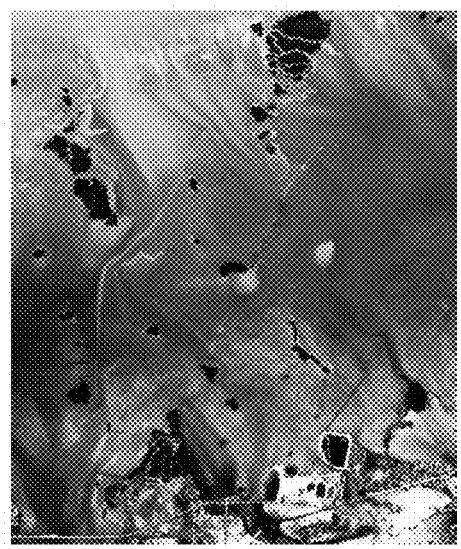
FIG. 8A is an original test image of the Florida Keys.
Figure 8B:
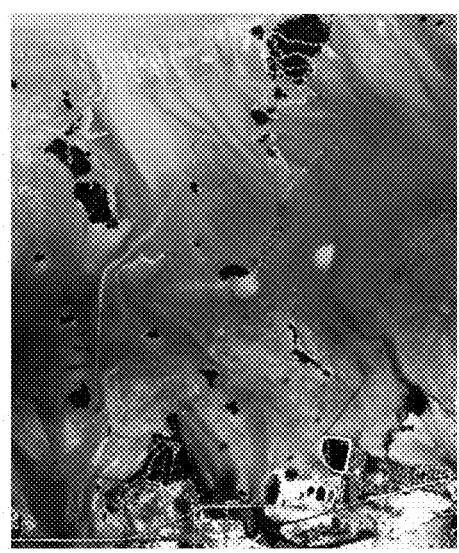
FIG. 8B is the reconstructed image after compression and decompression in accordance with an embodiment of the invention.

FIG. 8A shows the original test image of the Florida Keys, of size 614×512 pixels, and 63 channels. FIG. 8B shows the reconstructed image after compression and decompression with the GOCA method of with a compression ratio of 305:1.

Embodiments of the invention also are directed a computer software application configured as programmed instructions for implementing the hyperspectral image data compression method described herein, and to non-transitory computer readable media storing computer readable instructions thereon for implementing the method. The system can be implemented in Microsoft Visual C++, and operated on a Microsoft Windows computer operating system, although other programming languages and operating systems are also suitable.

The computer-based system can also include storage capabilities. All the acquired data, including original and compressed hyperspectral data cubes, individual images, can be stored locally in addition to being transmitted over a communications link.

In an exemplary embodiment, the system can operate without human control for compression and transmission of the compressed data, or can receive instructions via a communication link and user interface.

Other embodiments include computer software and computer programs, as well as computer systems and computer readable media having programs for implementing the methods discussed above. A computer system is generally applicable for the various embodiments described according to the present invention. The computer system can include a processor, a volatile memory, e.g., RAM, a keyboard, a pointing device, e.g., a mouse, a nonvolatile memory, e.g., ROM, hard disk, floppy disk, CD-ROM, and DVD, and a display device having a display screen. Memory can store program instructions that are executable by a processor to implement various embodiments of a method in accordance with the present invention. A communications device may also be connected to enable information exchange between the computer system and other devices.

It should be understood that the term "computer system" is intended to encompass any device having a processor that executes instructions from a memory medium. The memory medium preferably stores instructions (also known as a "software program") for implementing various embodiments of a method in accordance with the present invention. In various embodiments the one or more software programs are implemented in various ways, including procedure-based techniques, component-based techniques, and/or object-oriented techniques, among others. Specific examples include FORTRAN, C, C++, Java, Python and Perl.

By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices.

Although this invention has been described in relation to several exemplary embodiments thereof, it is well understood by those skilled in the art that other variations and modifications can be affected on the preferred embodiments without departing from scope and spirit of the invention as set forth in the claims.

What is claimed as new and desired to be protected by Letters Patent of the United States is:

1. A computer based method for compressing digital hyperspectral data having a plurality of spectral bands, each band having a plurality of image pixels $N_{xy}$, the method comprising:
reducing the plurality of spectral bands of the hyperspectral data to a smaller number of spectral bands using principal component analysis (PCA) transform;
determining an optimum compression ratio for each of the smaller number of spectral bands for use in a wavelet transform; and
subsequently compressing the smaller number of spectral bands spatially using the wavelet transform with the optimum compression ratios,
wherein said determining an optimum compression ratio for each of the smaller number of spectral bands includes minimizing the mean square error according to $$MSE_{xy}(cr_1, cr_2, \ldots cr_{N_r}) = \frac{1}{N_z} \sum_{m=1}^{N_r} \left[ e^{a_m\left(1 - 1/cr_m^{b_m}\right)} - 1 \right]$$

and $$\sum_{m=1}^{N_r} \frac{1}{cr_m} = \frac{N_r}{cr},$$

wherein $N_z$ is the number of spectral bands, $N_r$ is the remained hyperspectral dimension after the PCA transform, cr is the spectral compression ratio, $cr_m$ is a compression ratio for a spectral component m, and $a_m$ and $b_m$ are parameters empirically determined for each spectral component.

2. The method according to claim 1, wherein said finding an optimum compression ratio for each of the smaller number of spectral bands includes minimizing the spatial mean square error found as a sum of a semi-empirical rate distortion function for non-Gaussian images.

3. The method according to claim 1, further comprising:
for each of the smaller number of spectral bands, determining values of the parameters $a_m$ and $b_m$ by empirically solving a rate distortion function $$RDF(cr_m) = \frac{1}{N_{xy}} \sum_{i=1}^{N_{xy}} \Delta u_m^2(i, cr_m) = e^{a_m\left(1 - 1/cr_m^{b_m}\right)} - 1,$$

wherein $\Delta u_m(i, cr_m)$ is a reconstructed error value.

4. Computer readable non-transitory medium storing programmed instructions for compressing received digital hyperspectral image data received from at least one sensor, the digital hyperspectral image data having a plurality of spectral bands and each spectral band having a plurality of image pixels, the instructions comprising:
instructions for reducing the plurality of spectral bands of the hyperspectral data to a smaller number of spectral bands using principal component analysis (PCA) transform;
instructions for determining an optimum compression ratio for each of the smaller number of smaller number of spectral bands for use in a wavelet transform; and
instructions for subsequently compressing the smaller number of spectral bands spatially using the wavelet transform with the optimum compression ratios,
wherein said instructions for determining an optimum compression ratio for each of the smaller number of spectral bands includes instructions for minimizing the mean square error according to $$MSE_{xy}(cr_1, cr_2, \ldots cr_{N_r}) = \frac{1}{N_z} \sum_{m=1}^{N_r} \left[ e^{a_m\left(1 - 1/cr_m^{b_m}\right)} - 1 \right]$$

and $$\sum_{m=1}^{N_r} \frac{1}{cr_m} = \frac{N_r}{cr},$$

wherein $N_z$ is the number of spectral bands, $N_r$ is the remained hyperspectral dimension after the PCA transform, cr is the spectral compression ratio, $cr_m$ is a compression ratio for a spectral component m, and $a_m$ and $b_m$ are parameters empirically determined for each spectral component.

5. The computer readable medium according to claim 4, wherein said finding an optimum compression ratio for each of the smaller number of spectral bands includes minimizing the spatial mean square error found as a sum of a semi-empirical rate distortion function for non-Gaussian images.

6. The computer readable medium according to claim 4, further comprising:
instructions for, for each of the smaller number of spectral bands, determining values of the parameters $a_m$ and $b_m$ by empirically solving a rate distortion function $$RDF(cr_m) = \frac{1}{N_{xy}} \sum_{i=1}^{N_{xy}} \Delta u_m^2(i, cr_m) = e^{a_m\left(1 - 1/cr_m^{b_m}\right)} - 1,$$

wherein $\Delta u_m(i, cr_m)$ is a reconstructed error value.

7. A system for compressing received digital hyperspectral image data, the digital hyperspectral image data having a plurality of spectral bands and each spectral band having a plurality of image pixels, the system comprising:
a receiver for receiving the digital hyperspectral image data; and
a computer system having programmed instructions for reducing the plurality of spectral bands of the hyperspectral data to a smaller number of spectral bands using principal component analysis (PCA) transform,
instructions for determining an optimum compression ratio for each of the smaller number of spectral bands for use in a wavelet transform, and instructions for subsequently compressing the smaller number of spectral bands spatially using the wavelet transform with the optimum compression ratios,
wherein said instructions for determining an optimum compression ratio for each of the smaller number of spectral bands includes instructions for minimizing the overall mean square error according to $$MSE_{xy}(cr_1, cr_2, \ldots cr_{N_r}) = \frac{1}{N_z} \sum_{m=1}^{N_r} \left[ e^{a_m\left(1 - 1/cr_m^{b_m}\right)} - 1 \right]$$

and $$\sum_{m=1}^{N_r} \frac{1}{cr_m} = \frac{N_r}{cr},$$

wherein $N_z$ is the number of spectral bands, $N_r$ is the remained hyperspectral dimension after the PCA transform, cr is the spectral compression ratio, $cr_m$ is a compression ratio for a spectral component m, and $a_m$ and $b_m$ are parameters empirically determined for each spectral component.

8. The system according to claim 7, wherein said parameters $a_m$ and $b_m$ are determined for each reduced spectral component by empirically solving a rate distortion function $$RDF(cr_m) = \frac{1}{N_{xy}} \sum_{i=1}^{N_{xy}} \Delta u_m^2(i, cr_m) = e^{a_m\left(1 - 1/cr_m^{b_m}\right)} - 1,$$

wherein
$\Delta u_m(i, cr_m)$ is a reconstructed error value.

* * * * *